(12) United States Patent
Chu (10) Patent No.: US 6,621,974 B1
(45) Date of Patent: Sep. 16, 2003

(54) FIBER CONVERTER BOX

(76) Inventor: Max Chu, 4F., No. 126, Hsing Yun Street, Na Fu District, Taipei (TW)

( * ) Notice: Subject to any disclaimer, the term of this patent is extended or adjusted under 35 U.S.C. 154(b) by 84 days.

(21) Appl. No.: 09/994,848

(22) Filed: Nov. 28, 2001

(51) Int. Cl.[7] .................................................. G02B 6/00
(52) U.S. Cl. ...................................... 385/135; 385/138
(58) Field of Search ................................. 385/135, 139, 385/138, 88, 92; 438/138

(56) References Cited

U.S. PATENT DOCUMENTS

| | | | |
|---|---|---|---|
| 5,879,173 A | * | 3/1999 | Poplawski et al. ........... 439/138 |
| 6,396,990 B1 | * | 5/2002 | Ehn et al. .................... 385/135 |
| 6,533,470 B2 | * | 3/2003 | Ahrens ......................... 385/88 |
| 6,543,940 B2 | * | 4/2003 | Chu ............................. 385/53 |

* cited by examiner

*Primary Examiner*—Ellen E. Kim
(74) *Attorney, Agent, or Firm*—Varndell & Varndell, PLLC (57) ABSTRACT

A fiber converter box includes a box body covered with a top cover board, the box body having 8 slots in a vertical front panel thereof and a power switch and an alternating current socket and a fan installed in a vertical back panel thereof, a plurality of circuit board assemblies installed in the box body and respectively aimed at the slots and adapted to connect a respective unshielded twisted pair cable from the network interface card of an external personal computer to an external server through a switch-hub and a router, the top cover board having a downwardly extended back plate, which has two holes respectively coupled to the power switch and alternating current socket of the box body.

4 Claims, 11 Drawing Sheets

# FIBER CONVERTER BOX

BACKGROUND AND SUMMARY OF THE INVENTION

The present invention relates to fiber converter means and, more particularly, to a fiber converter box, which achieves the work of multiple fiber converters.

Figure 1:
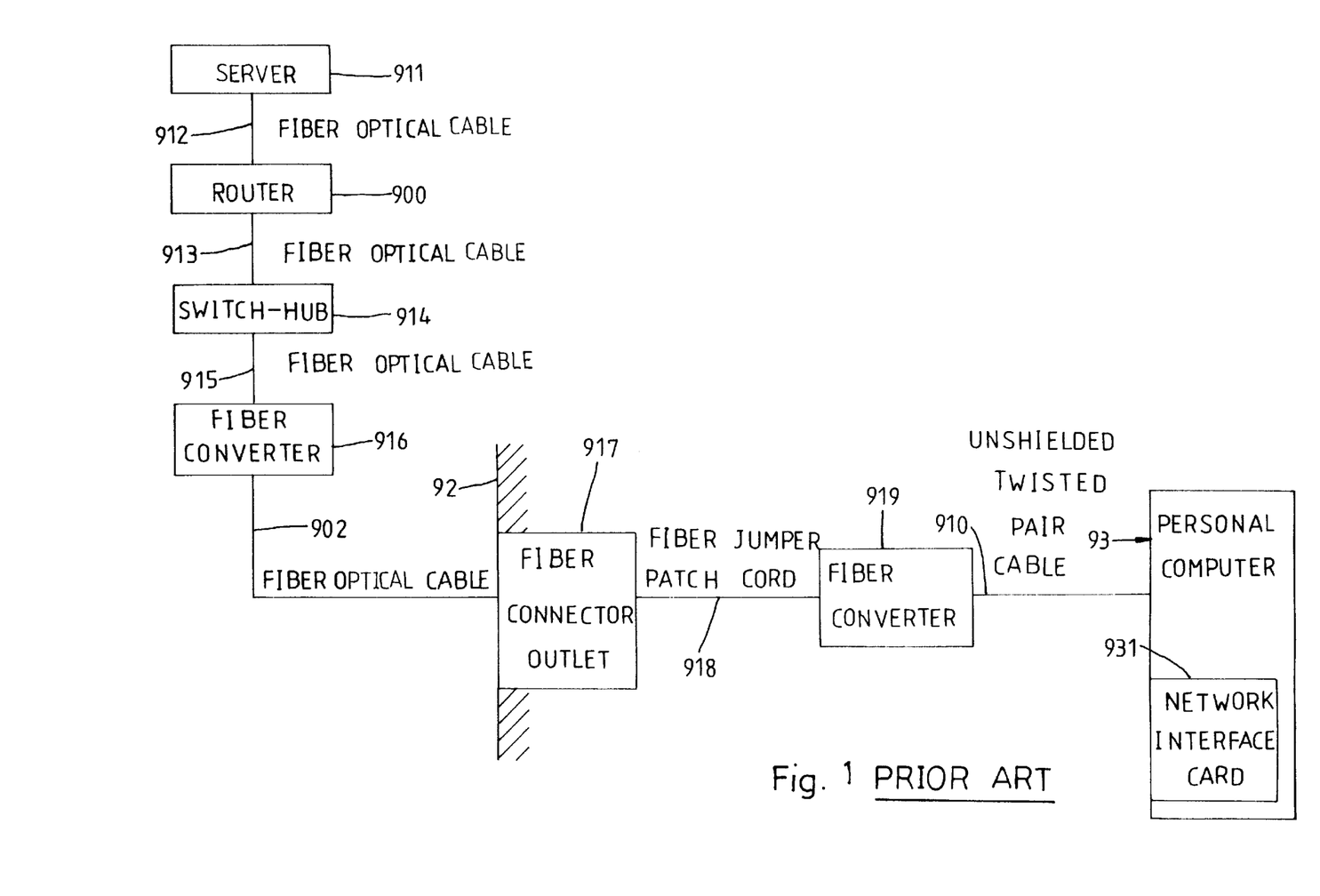
FIG. 1 is a circuit block diagram showing an installation example of a regular fiber converter in between a personal computer and a server according to the prior art.
Figure 2:
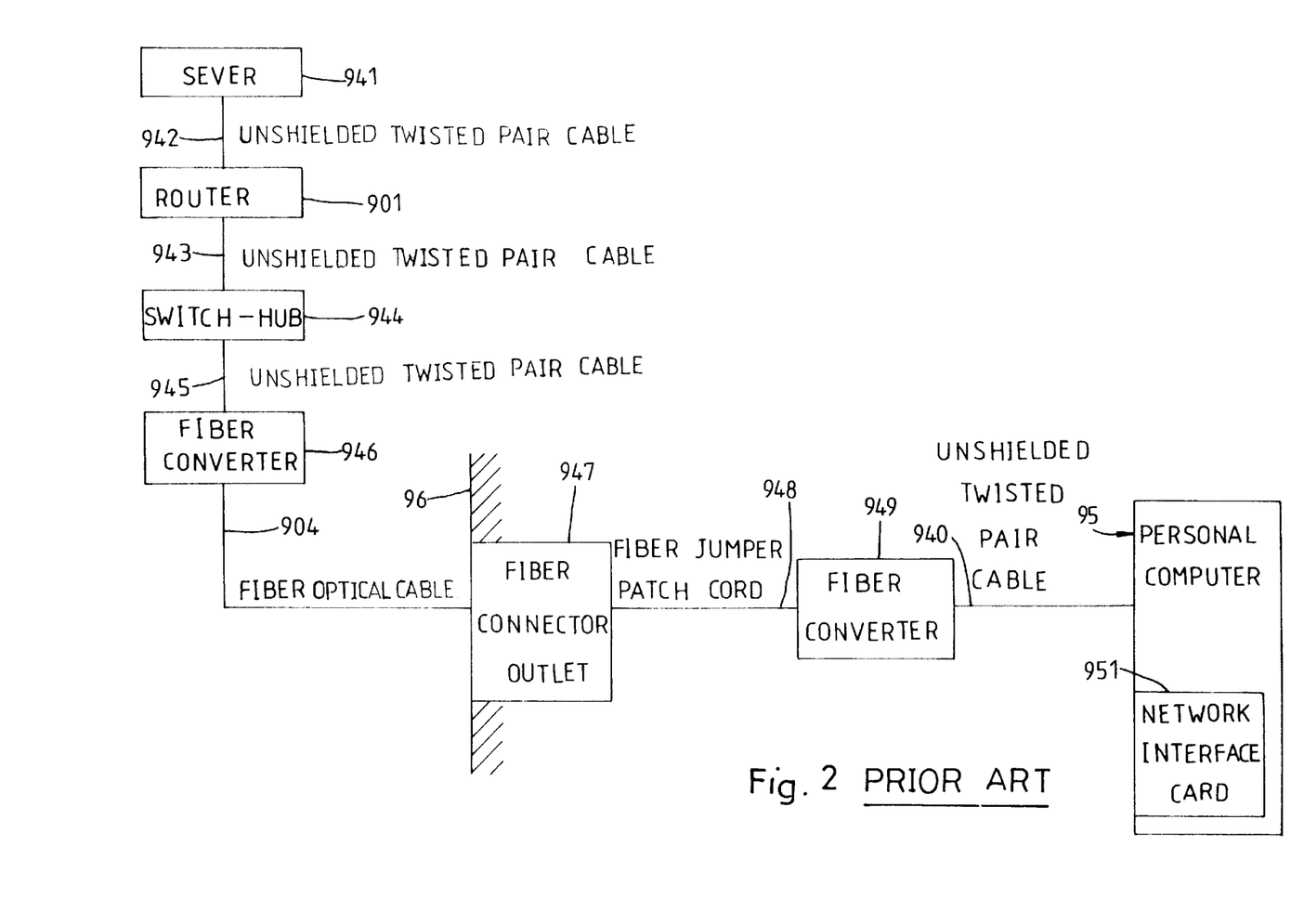
FIG. 2 is a circuit block diagram showing another installation example of a regular fiber converter in between a personal computer and a server according to the prior art.
Figure 3:
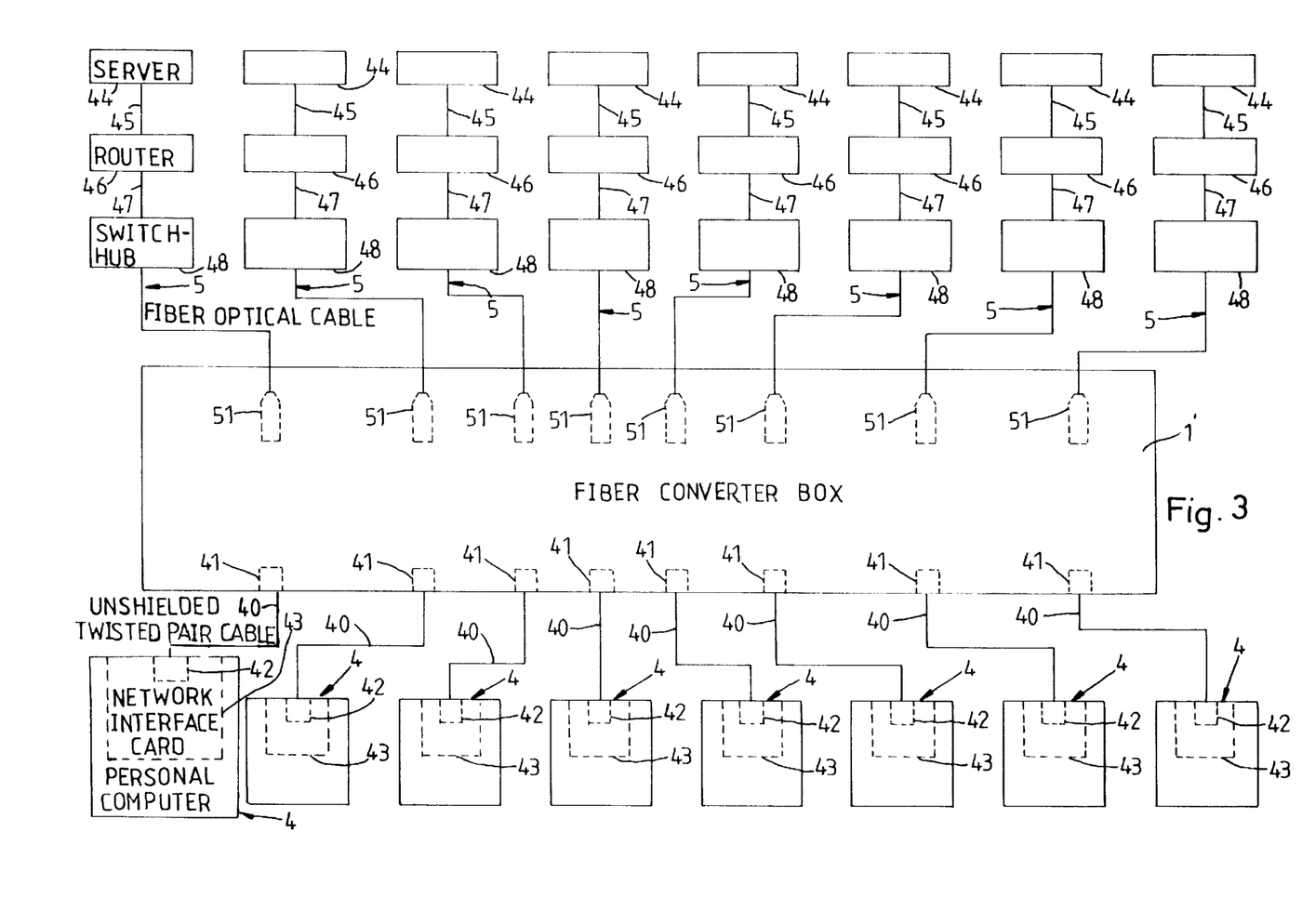
FIG. 3 is a circuit block diagram showing an installation example of the fiber converter box according to the present invention.

Regular personal-computer-to-server fiber optical transmission methods include two types respectively shown in FIGS. 1 and 2. According to the method shown in FIG. 1, the network interface card 931 of the personal computer 93 is connected to one side of a first fiber converter 919 by a unshielded twisted pair cable 910, the other side of the first fiber converter 919 is connected to a fiber connector outlet 917 in the wall 92 by a fiber jumper patch cord 918, which fiber connector outlet 917 is connected to a second fiber converter 916 through another fiber optical cable 902 and then to a switch-hub 914 through another fiber optical cable 915 and then to a router 900 through another fiber optical cable 913 and then to the server 911 through another fiber optical cable 912. According to the method shown in FIG. 2, the network interface card 951 of the personal computer 95 is connected to one side of a first fiber converter 949 by a unshielded twisted pair cable 940, the other side of the first fiber converter 949 is connected to a fiber connector outlet 947 in the wall 96 by a fiber jumper patch cord 948, which fiber connector outlet 947 is connected to a second fiber converter 946 through a fiber optical cable 904 and then to a switch-hub 944 through another unshielded twisted pair cable 945 and then to a router 901 through another unshielded twisted pair cable 943 and then to the server 941 through another unshielded twisted pair cable 942. The aforesaid conventional methods have common drawbacks as outlined hereinafter.

1. Because a big number of members are used (fiber converters 916;919;946;949, fiber jumper patch cord 918;948 and fiber connector outlet 917;947), the installation cost is high, and much installation space is required.

2. Because a big number of members are used the installation procedure is complicated, any connection error of either member (fiber converters 916; 919; 946; 949, fiber connector outlet 917; 947, fiber jumper patch cord 918; 948, fiber optical cables 904; 902; 912; 913; 915, unshielded twisted pair cables 910; 942; 943; 945; 940) causes an installation failure.

The present invention has been accomplished to provide a fiber converter box, which eliminates the aforesaid drawbacks. It is one object of the present invention to provide a fiber converter box, which achieves the work of multiple fiber converters. It is another object of the present invention to provide a fiber converter box, which saves much installation labor and time in connecting a personal computer to a server. According to one aspect of the present invention, the fiber converter box has 8 slots in the vertical front panel of the box body thereof for the mounting of 8 circuit board assemblies, enabling the fiber converter box to achieve the work of 8 conventional fiber converters. According to another aspect of the present invention, the user can change the number of the number of circuit board assemblies to fit different requirements. According to still another aspect of the present invention, the fiber converter box has a top cover board covering the box body, which top cover board has a downwardly extended back plate with two holes coupled to a power switch and an alternating current socket of the box body. Therefore, the user must disconnect the plug of the power cable from the alternating current socket of the box body before dismounting the top cover board from the box body to prevent an accident during a repair or maintenance work of the fiber converter box.

DETAILED DESCRIPTION OF THE PREFERRED EMBODIMENT

Referring to Figures from 3 through 12, a fiber converter box 1' in accordance with the present invention is shown comprising a box body 1, a top cover board 10, a plurality of faceplates 21, a plurality of ornamental cover plates 22, and a plurality of circuit board assemblies 3.

The box body 1 is a top-open case comprising a horizontal bottom panel 14, a vertical front panel 12 disposed at the front side of the horizontal bottom panel 14, a vertical back panel 16 disposed at the rear side of the horizontal bottom panel 14, two vertical side panels 19 disposed at two opposite lateral sides of the horizontal bottom panel 14 and connected in parallel between the vertical front panel 12 and the vertical back panel 16, a plurality of slots 121 formed through the front panel 12 for the mounting of the faceplates 21 or ornamental cover plates 22, a front coupling flange 11 backwardly extended along the top of the vertical front panel 12, a plurality of top screw holes 190 respectively disposed in the top of each of the vertical side panels 19 adjacent to the vertical back panel 16, an elongated rack 13 connected between the vertical side panels 19 behind the vertical front panel 12, the rack 13 having a plurality of top screw holes 131 to which the circuit board assemblies 3 are fastened, an alternating current adapter 15 fixedly mounted on the horizontal bottom panel 14 by screws 63, a power switch 17 and an alternating current socket 18 and a fan 180 are respectively fixedly mounted in the vertical back panel 16, and a back opening 191 in one back corner thereof between the vertical back panel 16 and one vertical side panel 19 through which fiber optical cables 5 are inserted, enabling respective fiber connectors 51 of the fiber optical cables 5 to be respectively connected to respective fiber optical transceivers 38 of the circuit board assemblies 3.

The top cover board 10 is covered on the box body 1, comprising a plurality of front coupling flanges 101 respectively hooked up with the front coupling flange 101 of the box body 1, and a plurality of vertical mounting holes 102 (see FIG. 5) disposed near the rear side thereof and respectively fastened to the screw holes 190 of the box body 1 by a respective screw 61.

The faceplates 21 each comprise a plurality of backwardly extended top mounting strips 211 and bottom mounting strips 212 (see FIG. 10) for positioning in the slots 121 in the vertical front panel 12 of the box body 1, and an insertion slot 213. The top mounting strips 211 each have a top retaining block 2111 for engagement with the bottom edge 110 of the front coupling flange 11 of the box body 1. The bottom mounting strips 212 are adapted to support the circuit board assemblies 3 on the rack 13 each having retaining rod 2121 for engagement with the circuit board assemblies 3.

The ornamental cover plates 22 are adapted to close the slots 121 of the vertical front panel 12 of the box body 1, each comprising a plurality of backwardly extended top mounting strips 221 and bottom mounting strips 222 (see FIG. 12) for positioning in the slots 121 in the vertical front panel 12 of the box body 1. The top mounting strips 221 each have a top retaining block 2211 for engagement with the bottom edge 110 of the front coupling flange 11 of the box body 1.

The circuit board assemblies 3 (see FIGS. 6 and 9), each comprises a circuit board 30, and a set of electronic devices respectively mounted on the circuit board 30. The electronic devices include a video signal connector 33 with a RJ45 jack 331, a power on/off indicator light emitted diode 34, a fiber optical transmission indicator light emitted diode 351, a RJ45 transmission indicator light emitted diode 352, a Full/Half duplex indicator light emitted diode 353, an alternating current socket 36, a crystal 37, a line transformer 31, a transceiver integrated circuit 32, a fiber optical transceiver 38 with a fiber connector jack 381, and a Full/Half duplex switch 39. The circuit board 30 (see FIG. 11) have two mounting notches 300 for engagement with the retaining rod 2121 of one faceplates 21 and a mounting hole 302 for fastening to one top screw hole 131 of the rack 13 by a screw 62.

When in use, a predetermined number of the faceplates 21 are selectively fastened to the slots 121 in the vertical front panel 12 of the box body 1, and equal number of the circuit board assemblies 3 are fixedly fastened to the rack 13 and the faceplates 21. After installation of the predetermined number of the faceplates 21, ornamental cover plates 22 are fastened to the vertical front panel 12 of the box body 1 to close the other vacant slots 121 respectively. After installation of the circuit board assemblies 3 in the box body 1, the fiber connector jack 381 of the fiber optical transceiver 38 of each circuit board assembly 3 is respectively connected to the fiber connector 51 of a respective fiber optical cable 5, which is connected to a server 44 through a router 46 via a switch-hub 48, the RJ45 jack 331 of the video signal connector 33 of each circuit board assembly 3 is respectively connected to the RJ45 plug 41 at one end of a respective unshielded twisted pair cable 40, which has a second RJ45 plug 42 connected to the RJ45 jack (not shown) of the network interface card 43 of a personal computer 4. According to the present preferred embodiment, the box body 1 has 8 slots 121 for the installation of 8 circuit board assemblies 3, i.e., the fiber converter box achieve the function of 8 conventional fiber converters.

Figure 6:
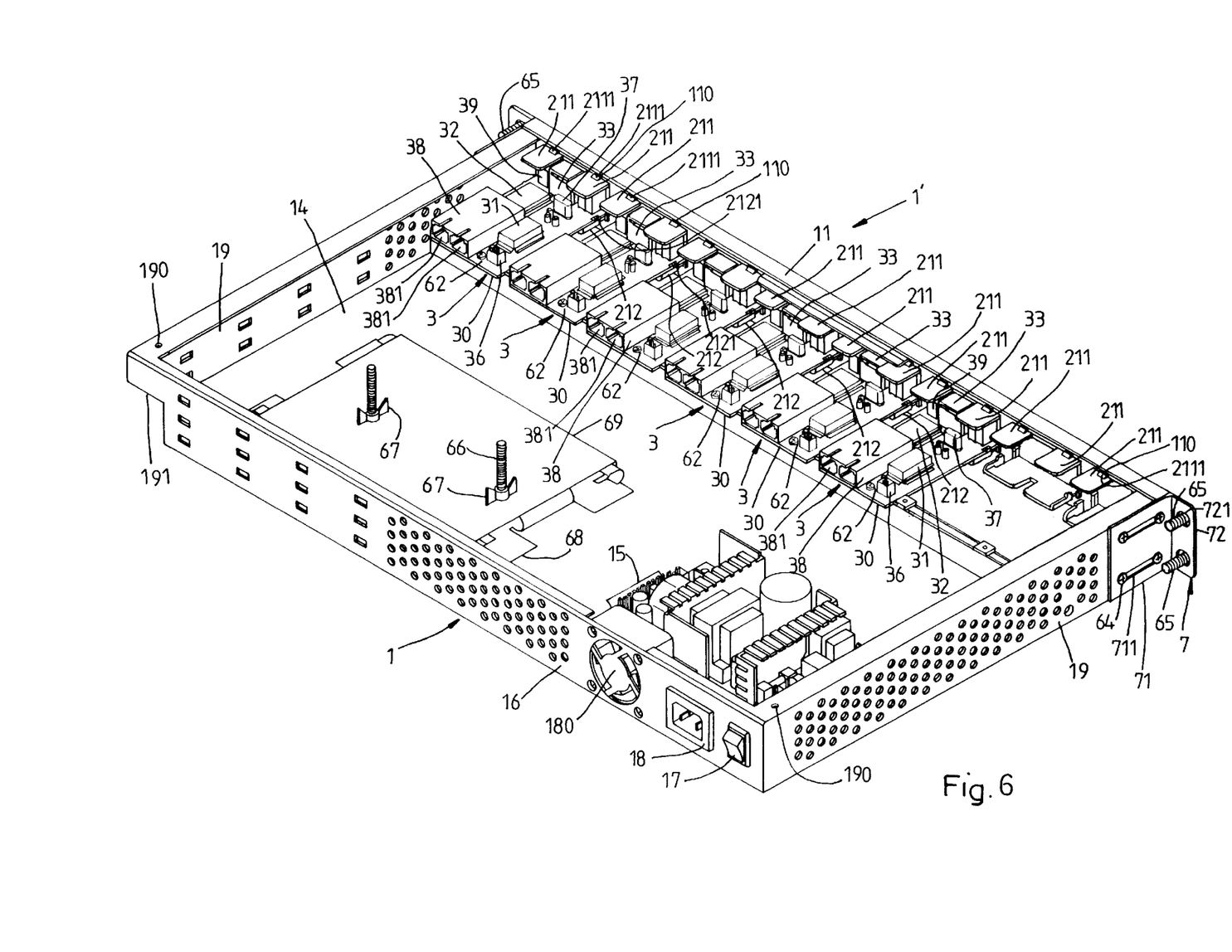
FIG. 6 is a perspective assembly view of the fiber converter box according to the present invention (the top cover board excluded).
Figure 7:
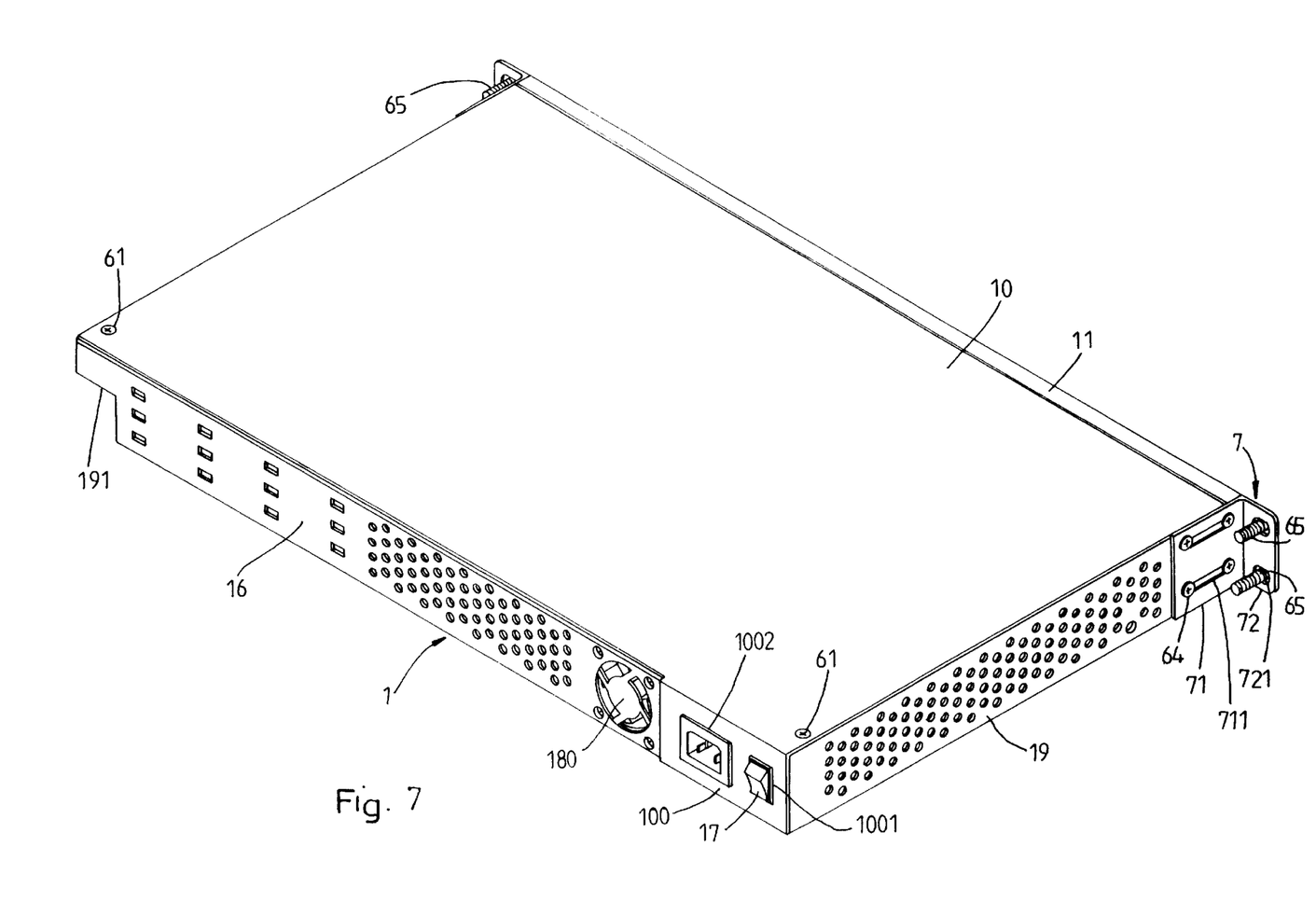
FIG. 7 is an oblique rear elevation of the fiber converter box according to the present invention.
Figure 8:
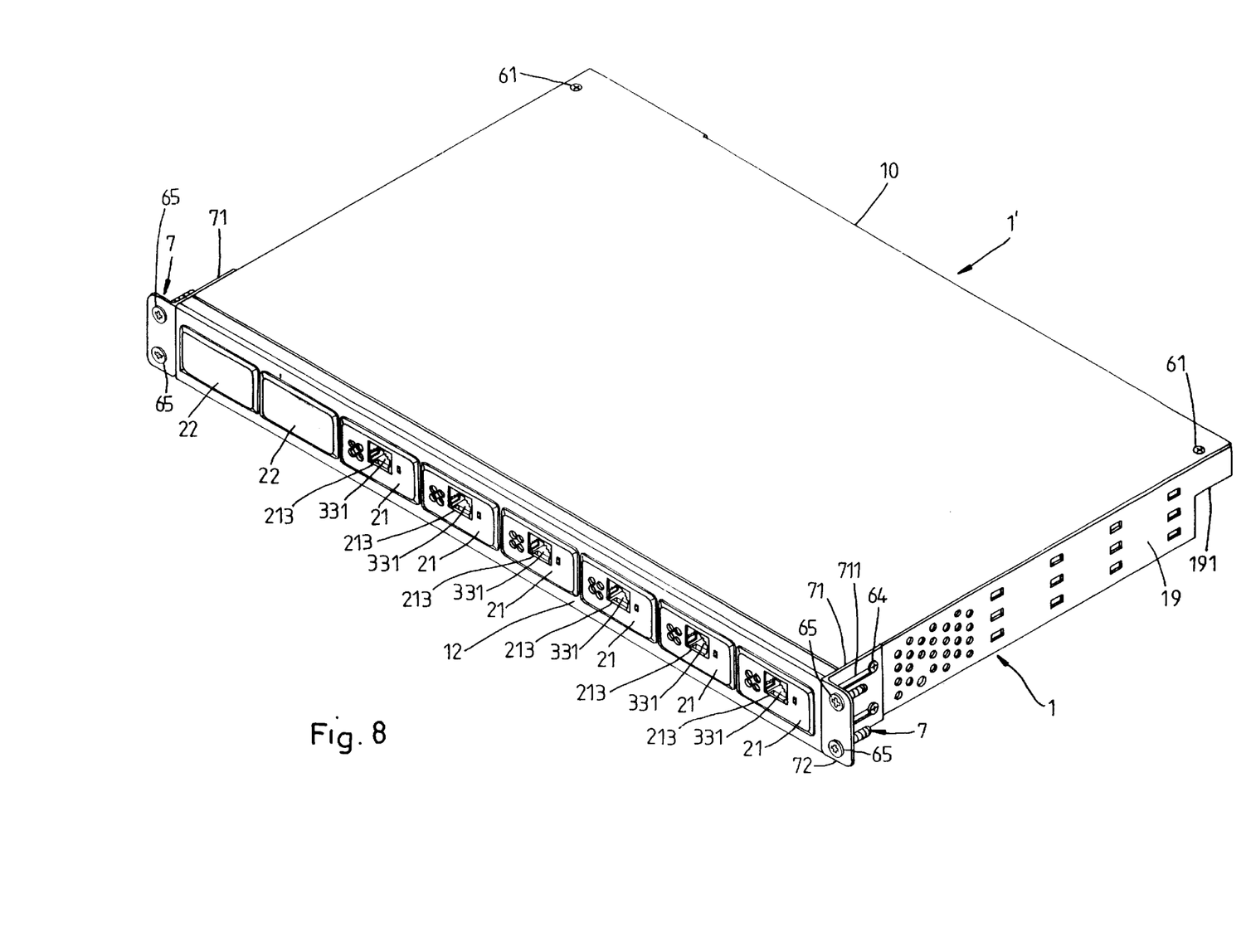
FIG. 8 is an oblique front elevation of the fiber converter box according to the present invention.
Figure 9:
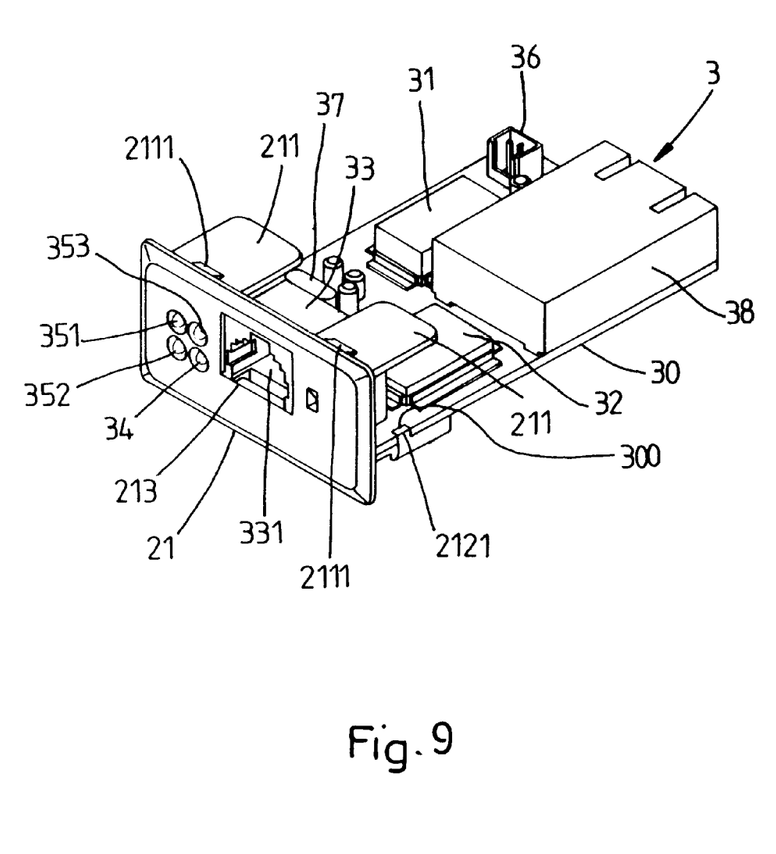
FIG. 9 is an elevational view in an enlarged scale of a part of the present invention, showing one faceplate fastened to one circuit board assembly.
Figure 10:
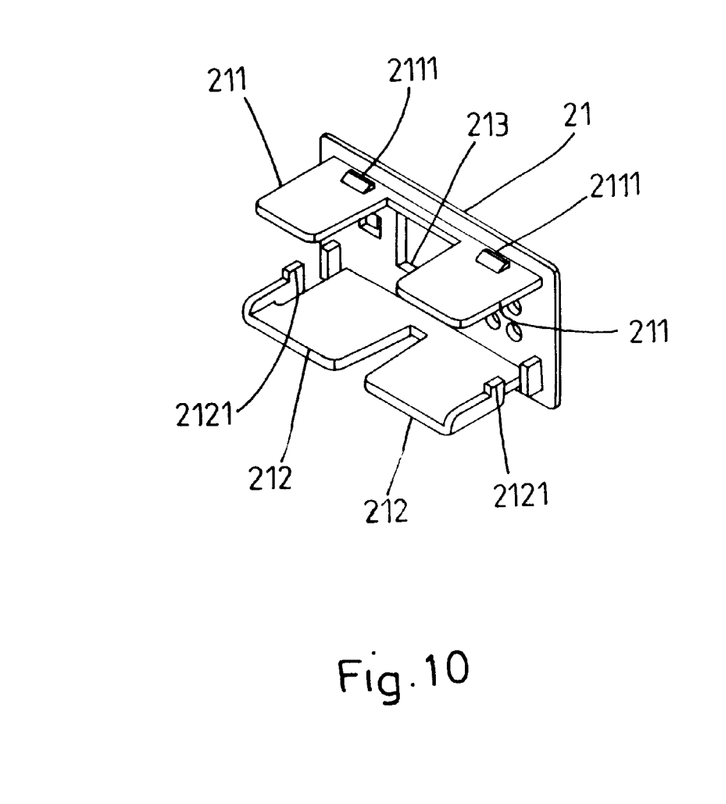
FIG. 10 is a rear elevation in an enlarged scale of one faceplate for the fiber converter box according to the present invention.
Figure 11:
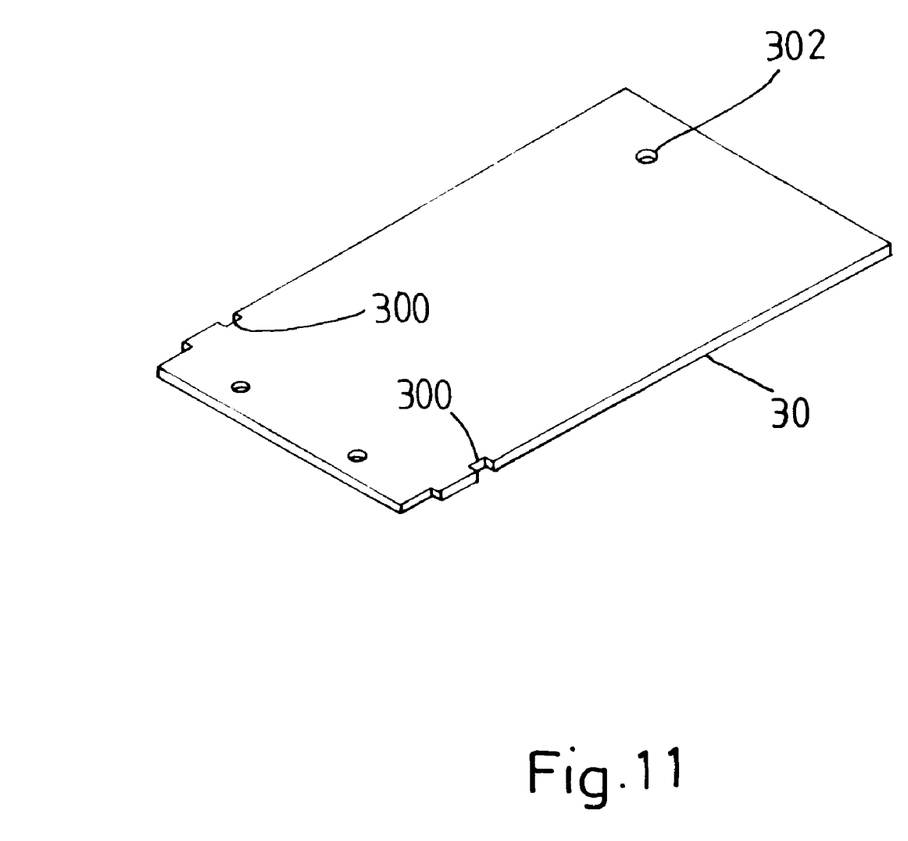
FIG. 11 is an elevational view in an enlarged scale of one circuit board for the fiber converter box according to the present invention.
Figure 12:
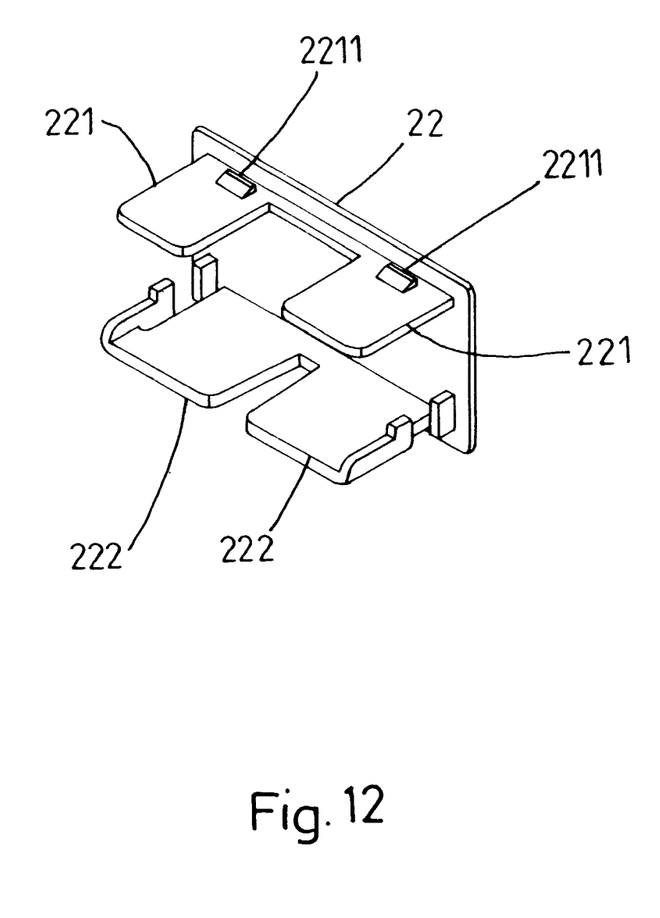
FIG. 12 is a rear elevation of one ornamental cover plate for the fiber converter box according to the present invention.

Referring to FIGS. 6 and 7, two angled mounting plates 7 are respectively fastened to the vertical side panels 19 of the box body 1 for mounting. The angled mounting plates 7 each comprise a first mounting wall 71, a plurality of first mounting holes 711 disposed in the first mounting wall 71 and respectively fastened to one vertical side panel 19 of the box body 1 by respective screws 64, a second mounting wall 72 perpendicularly extended from the rear side of the first mounting wall 71, and a plurality of second mounting holes 721 disposed in the second mounting wall 72 and respectively fastened to, for example, the electronic cabinet rack (not shown) of a building by respective screws 65. Alternatively, the second mounting holes 721 can be fastened to one vertical side panel 19 of the box body 1, enabling the first mounting holes 711 to be fastened to the electronic cabinet rack.

Referring to FIG. 4 again, the horizontal bottom panel 1 of the box body 1 has a plurality of mounting holes 141 for mounting. By means of the mounting holes 141, the horizontal bottom panel 14 of the box body 1 can be fixedly fastened to a flat wall surface by screws.

Figure 4:
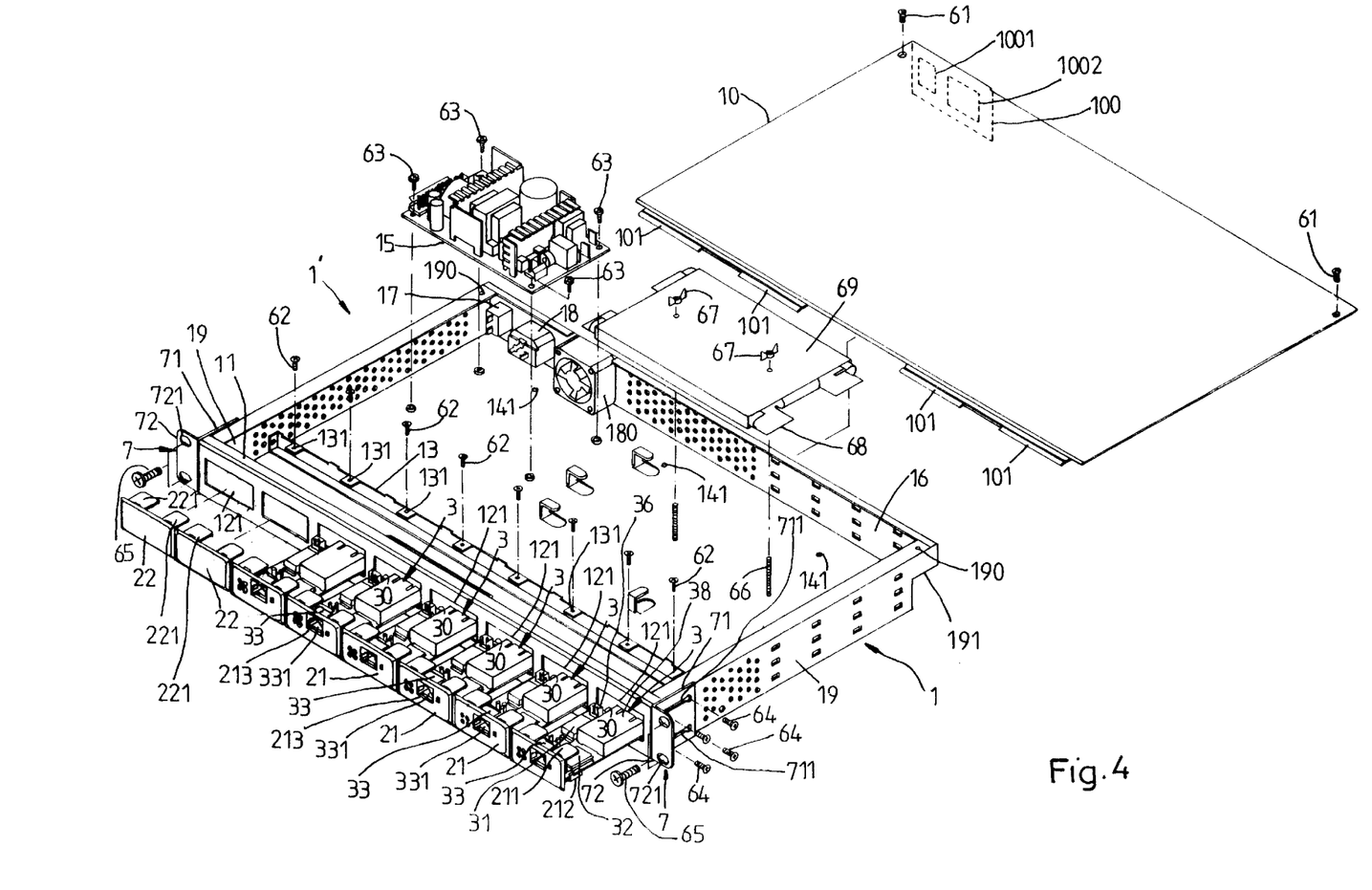
FIG. 4 is an exploded view of the fiber converter box according to the present invention.
Figure 5:
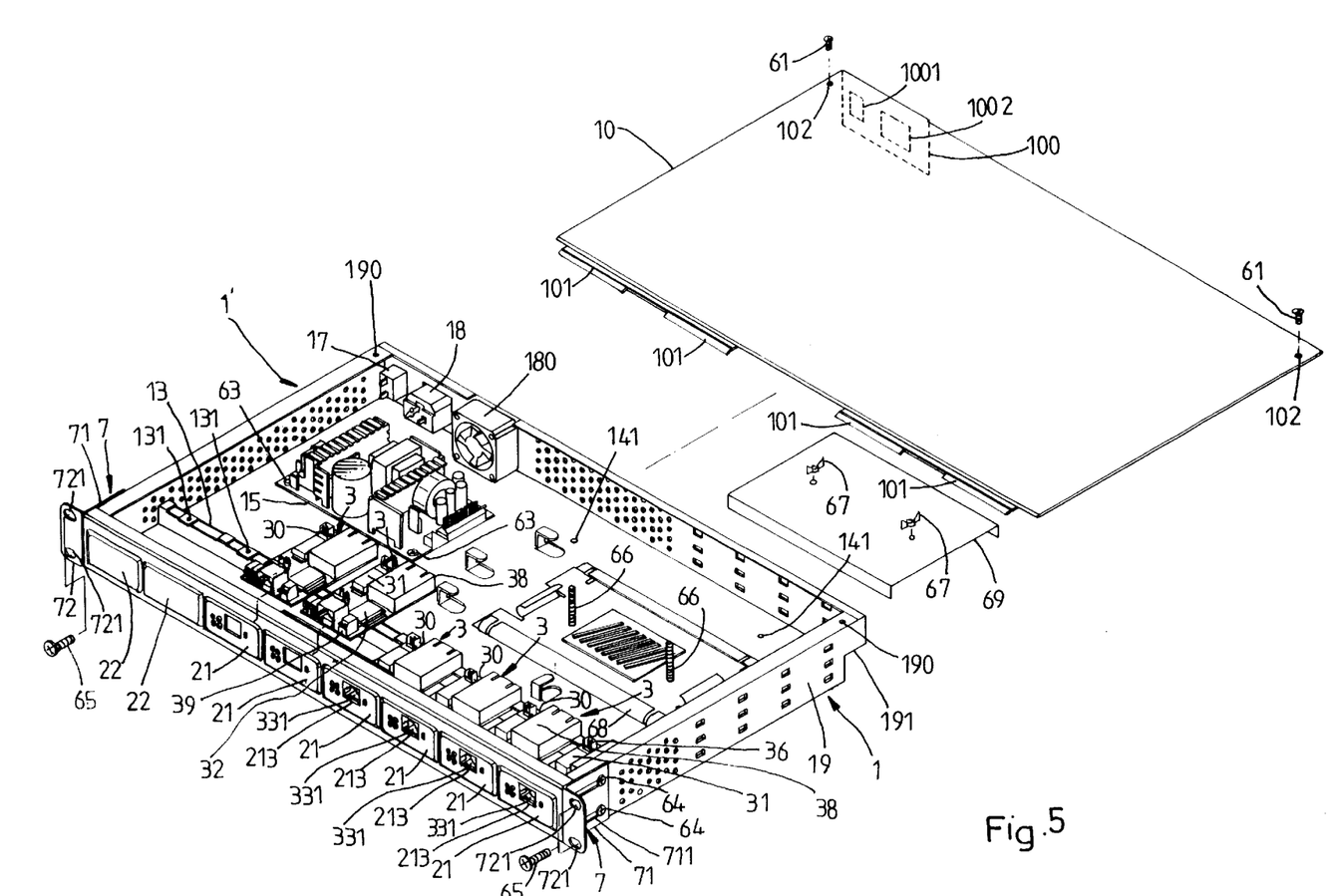
FIG. 5 is another exploded view of the fiber converter box according to the present invention.

Referring to FIGS. 4, 5, and 7, the top cover board 10 further comprises a downwardly extended back plate 100. The back plate 100 has two holes 1001; 1002, which receive the power switch 17 and the alternating current socket 18 respectively. Because the back plate 100 is coupled to the power switch 17 and the alternating current socket 18 in the vertical back panel 16 of the box body 1, the top cover board 10 is maintained connected to the box body 1 after removal of the screws 61 from the vertical mounting holes 102. Therefore, the user must disconnect the plug of the power cable (not shown) from the alternating current socket 18 before dismounting the top cover board 10 from the box body 1.

Referring to Figures from 4 through 6, a fiber optical cable organizing box 68 is covered with a cover 69 and fastened to the horizontal bottom panel 14 of the box body 1 by screws 66 and wing nuts 67 to keep the installed fiber optical cables 5 in good order.

As indicated above, the present invention provides a fiber converter box, which achieves the following advantages:

1. The vertical front panel 12 of the box body 1 has 8 slots 121 for the mounting of 8 circuit board assemblies 3, enabling the fiber converter box to achieve the work of 8 conventional fiber converters.

2. The user can change the number of the faceplates 21 and the number of circuit board assemblies 3 to fit different requirements.

3. Because top cover board 10 has a downwardly extended back plate 100 with two holes 1001; 1002 coupled to the power switch 17 and the alternating current socket 18 respectively, the user must disconnect the plug of the power cable from the alternating current socket 18 before dismounting the top cover board 10 from the box body 1 to prevent an accident during a repair or maintenance work of the fiber converter box.

A prototype of fiber converter box has been constructed with the features of FIGS. 3~12. The fiber converter box functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fiber converter box comprising:

a box body, said box body comprising a horizontal bottom panel, said horizontal bottom panel having a front side, a rear side, and two opposite lateral sides, a vertical front panel disposed at the front side of said horizontal bottom panel, a vertical back panel disposed at the rear side of said horizontal bottom panel, two vertical side panels disposed at the two opposite lateral sides of said horizontal bottom panel and connected in parallel between said vertical front panel and said vertical back panel, a plurality of slots formed through said vertical front panel, a front coupling flange backwardly extended along a top side of said vertical front panel, a plurality of top screw holes respectively disposed in each of said vertical side panels adjacent to said vertical back panel, an elongated rack connected between said vertical side panels behind said vertical front panel, said rack having a plurality of top screw holes, an alternating current adapter fixedly mounted on said horizontal bottom panel by screws, a power switch and an alternating current socket and a fan respectively fixedly mounted in said vertical back panel, and a back opening in one back corner thereof between said vertical back panel of and one of said vertical side panels and adapted to receive external fiber optical cables;

a top cover board covered on said box body, said top cover board comprising a plurality of front coupling flanges respectively hooked up with said front coupling flange of said box body, and a plurality of vertical mounting holes disposed near a rear side thereof and respectively fastened to the screw holes of said box body by a respective screw;

a plurality of faceplates selectively fastened to the slots of said vertical front panel of said box body, said faceplates each comprising a plurality of backwardly extended top mounting strips and bottom mounting strips for positioning in the slots of said vertical front panel of said box body, and an insertion slot for the insertion of a RJ45 plug of a unshielded twisted pair cable being connected to the network interface card of a personal computer, said top mounting strips each having a top retaining block adapted to engage said front coupling flange of said box body;

a plurality of ornamental cover plates adapted to close the slots of said vertical front panel of said box body selectively, said ornamental cover plates each comprising a plurality of backwardly extended top mounting strips and bottom mounting strips for positioning in the slots of said vertical front panel of said box body, the top mounting strips of said ornamental cover plates each having a top retaining block adapted to engage said front coupling flange of said box body; and a plurality of circuit board assemblies mounted inside said box body, said circuit board assemblies each comprising a circuit board and a set of electronic devices respectively mounted on said circuit board, said electronic devices including a video signal connector, said video signal connector having a RJ45 jack aimed at one slot in said vertical front panel of said box body and adapted to receive the RJ45 plug of a unshielded twisted pair cable being connected to the network interface card of a personal computer, a power on/off indicator light emitted diode, a fiber optical transmission indicator light emitted diode, a RJ45 transmission indicator light emitted diode, a Full/Half duplex indicator light emitted diode, an alternating current socket, a crystal, a line transformer, a transceiver integrated circuit, a fiber optical transceiver, and a Full/Half duplex switch, said fiber optical transceiver comprising a fiber connector jack adapted to receive the fiber connector of an external fiber optical cable being inserted through the back opening of said box body and connected to an external server through an external router via an external switch-hub.

2. The fiber converter box as claimed in claim 1 further comprising two angled mounting plates, said angled mounting plates each comprising a first mounting wall attached to one vertical side panel of said box body, a plurality of first mounting holes disposed in said first mounting wall and respectively fastened to one vertical side panel of said box body by respective screws, a second mounting wall perpendicularly extended from one side of said first mounting wall, and a plurality of second mounting holes disposed in said second mounting wall for fastening to the electronic cabinet rack of a building by respective screws.

3. The fiber converter box as claimed in claim 1 wherein said horizontal bottom panel comprises a plurality of mounting holes for mounting.

4. The fiber converter box as claimed in claim 1 wherein said top cover board comprises a downwardly extended back plate, said back plate having two holes, which receive said power switch and said alternating current socket of said box body respectively.

\* \* \* \* \*